(12) United States Patent
Emshwiller et al.

(10) Patent No.: US 10,090,878 B2
(45) Date of Patent: Oct. 2, 2018

(54) MOTOR DRIVE SYSTEM AND METHOD

(71) Applicant: Franklin Electric Co., Inc., Fort Wayne, IN (US)

(72) Inventors: Greg A. Emshwiller, Fort Wayne, IN (US); Richard J. Halsey, Fort Wayne, IN (US); Christopher J. Hawkins, Fort Wayne, IN (US); Douglas C. Lynn, Fort Wayne, IN (US); Robert C. Smith, Ossian, IN (US); Ross E. Waite, Fort Wayne, IN (US); James H. Spreen, Huntington, IN (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 0 days.

(21) Appl. No.: 14/916,995

(22) PCT Filed: Aug. 28, 2014

(86) PCT No.: PCT/US2014/053231
§ 371 (c)(1),
(2) Date: Mar. 4, 2016

(87) PCT Pub. No.: WO2015/034751
PCT Pub. Date: Mar. 12, 2015

(65) Prior Publication Data
US 2016/0197640 A1 Jul. 7, 2016

Related U.S. Application Data

(60) Provisional application No. 61/874,203, filed on Sep. 5, 2013.

(51) Int. Cl.
*H04B 1/40* (2015.01)
*H02P 25/02* (2016.01)
*G08C 17/02* (2006.01)

(52) U.S. Cl.
CPC ............... *H04B 1/40* (2013.01); *G08C 17/02* (2013.01); *H02P 25/02* (2013.01)

(58) Field of Classification Search
CPC ............ G08C 17/02; H04B 1/40; H02P 25/02
(Continued)

(56) References Cited

U.S. PATENT DOCUMENTS 5,490,030 A * 2/1996 Taylor .................... H02H 1/04
361/45
5,648,892 A 7/1997 Wieloch
(Continued)

FOREIGN PATENT DOCUMENTS

WO 2001/080199 10/2001
WO 2008/124765 10/2008

OTHER PUBLICATIONS

International Preliminary Report on Patentability for PCT/US2014/053231, dated Mar. 8, 2016, 6 pgs.
(Continued)

*Primary Examiner* — Rina Duda
*Assistant Examiner* — Devon Joseph
(74) *Attorney, Agent, or Firm* — Faegre Baker Daniels LLP (57) ABSTRACT

A system and a method for driving an electrical motor with a drive unit including a wireless transceiver. A user may wirelessly couple a user input device with the transceiver, and use a drive application to, optionally, update configuration information including drive control parameters, update application logic residing in the drive unit, and/or upload performance parameters.

22 Claims, 7 Drawing Sheets

(58) Field of Classification Search
USPC .......................................................... 318/727
See application file for complete search history.

(56) References Cited

U.S. PATENT DOCUMENTS

| | | | | |
|---|---|---|---|---|
| 7,668,605 B2* | 2/2010 | Braun | ................ | G05B 19/4185 |
| | | | | 700/17 |
| 7,676,285 B2* | 3/2010 | Hoyte | ................ | G05B 23/0294 |
| | | | | 700/49 |
| 7,821,220 B2* | 10/2010 | El-Ibiary | ................... | H02P 5/00 |
| | | | | 318/538 |
| 8,384,338 B2 | 2/2013 | Lu | | |
| 8,447,568 B2* | 5/2013 | Doddek | ............. | G05B 23/0235 |
| | | | | 702/183 |
| 8,482,240 B2* | 7/2013 | El-Ibiary | ................... | H02P 5/00 |
| | | | | 318/400.09 |
| 8,760,089 B2 | 6/2014 | Smith | | |
| 8,853,984 B2 | 10/2014 | Yeh | | |
| 2003/0072117 A1* | 4/2003 | Maekawa | ............... | H02M 1/08 |
| | | | | 361/86 |
| 2006/0105896 A1* | 5/2006 | Smith | ................... | B04B 1/2016 |
| | | | | 494/7 |
| 2006/0279885 A1* | 12/2006 | Sung | ........................ | H02H 3/05 |
| | | | | 361/42 |
| 2008/0197797 A1* | 8/2008 | El-Ibiary | ................... | H02P 5/00 |
| | | | | 318/567 |
| 2010/0048985 A1* | 2/2010 | Henke | ................ | A61B 5/02055 |
| | | | | 600/28 |
| 2010/0114810 A1* | 5/2010 | Hoyte | ................ | G05B 23/0294 |
| | | | | 706/47 |
| 2010/0310382 A1 | 12/2010 | Kidd | | |
| 2010/0312401 A1* | 12/2010 | Gutierrez | ............. | E21B 33/068 |
| | | | | 700/282 |
| 2011/0025249 A1* | 2/2011 | El-Ibiary | ................... | H02P 5/00 |
| | | | | 318/567 |
| 2011/0044823 A1 | 2/2011 | Stiles | | |
| 2013/0293160 A1* | 11/2013 | El-Ibiary | ................... | H02P 5/00 |
| | | | | 318/51 |
| 2014/0042955 A1 | 2/2014 | Kidd | | |
| 2015/0105909 A1* | 4/2015 | Gutierrez | ............. | E21B 33/068 |
| | | | | 700/272 |
| 2017/0097881 A1* | 4/2017 | Hodel | ................ | G06F 11/3672 |

OTHER PUBLICATIONS

International Search Report and Written Opinion dated Nov. 2, 2014 in International Application No. PCT/US2014/053231.
Xylem, Inc., "VeraFlex Series, Flexible Impeller Pump Cart System", 2012, 2 pages.
Bell & Gossett, "ecocirc XL, Electronic Drive Manual", 2014, 22 pages.

* cited by examiner

MOTOR DRIVE SYSTEM AND METHOD

CROSS-REFERENCE TO RELATED APPLICATIONS

This is a National stage application under 35 U.S.C. 071 of International Application No. PCT/US2014/053231, filed Aug. 28, 2014, which claims the benefit of priority from U.S. Provisional Patent Application No. 61/874,203, filed Sep. 5, 2013, titled "MOTOR DRIVE SYSTEM AND METHOD." The disclosures of said patent applications are expressly incorporated herein by reference in their entirety.

FIELD OF THE DISCLOSURE

The disclosure relates generally to a system and a method for driving a motor. More particularly, the disclosure relates to a drive unit controlling a motor.

BACKGROUND OF THE DISCLOSURE

Fluid supply systems use motors to drive pumps and transfer fluids from supply reservoirs, such as wells, to demand reservoirs, such as tanks. A sensor measures a characteristic of the fluid, and a controller controls operation of the motor. In some systems, the controller measures a level of the fluid in a tank and controls operation of the motor to maintain the level within a range. When the level reaches the low end of the range, the controller turns the motor on and keeps it on until the level reaches the high end of the range. In other systems, the speed of the motor is controlled to maintain pressure within predetermined parameters. A variable speed loop controls the speed of the motor within a variable speed range to gradually increase or decrease the pumping rate and thereby maintain the pressure near the setpoint. Induction motors are frequently used in fluid supply systems.

SUMMARY OF THE DISCLOSURE

Exemplary embodiments of a system and a method for driving an electrical motor are provided herein. In one embodiment, the system includes a drive unit with a wireless transceiver. A user may wirelessly couple a user input device with the transceiver, and use a drive application to, optionally, update configuration information including drive control parameters, update application logic residing in the drive unit, and/or upload performance parameters. In one example, the user may use the user input device to access support logic residing in a web server to download logic updates.

In another embodiment, the drive unit includes an expendable external signal input board. In one example, the expendable external signal input board comprises quick-disconnect connectors configured to quickly attach and detach the expendable external signal input board from a main board.

In another embodiment, the drive unit includes a flux fringing filter comprising three open-core inductors arranged in a triangular topology. An exemplary triangular topology comprises an equilateral triangle.

In one embodiment, the drive unit includes installation logic. In one variation of the present embodiment, the installation logic automatically verifies that system components selected with a user input device match installed components by comparing installed component characteristics stored in component profiles to measurements performed after installation of the components. Exemplary measurements include the direction of rotation of a motor and actual drive unit performance for a given fluid parameter.

In another variation of the present embodiment, the installation logic facilitates selection of a system application. The system application includes information that permits a motor to drive a load in accordance with predetermined procedures embodied in the system application. The system application may be selected to maintain fluid pressure, flow rate, or fluid level, for example, with a selected pump-motor assembly (PMA) or selected pump type. Different pump types have different performance characteristics. In one example, the installation logic presents a graphical user interface with which a user can choose an application, and the installation logic also facilitates tailoring of a pump profile based on the selected application. In another example, the installation logic presents a graphical user interface with which a user can choose a PMA, and the installation logic then chooses a pump profile. In a variation of the present embodiment, the installation logic selects a system application or a pump profile based on the selection of the pump type.

In a further variation of the present embodiment, the installation logic facilitates user selection of an operating mode. In one variation, the operating mode is a life extension mode in which the speed of the motor is folded back to maintain a relatively constant power module temperature. In another variation, the operating mode is an efficiency mode in which the fluid parameter is controlled within a wider than typical control band to reduce the number of control adjustments.

The foregoing embodiments and many of the attendant advantages of this invention will become more readily appreciated as the same become better understood by reference to the following detailed description when taken in conjunction with the accompanying drawings.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner. As used herein, the terms "comprising" and "including" denote an open transition meaning that the claim in which the open transition is used is not limited to the elements following the transitional term.

DETAILED DESCRIPTION

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the disclosure is thereby intended. The invention includes any alterations and further modifications in the illustrated devices and described methods and further applications of the principles of the invention which would normally occur to one skilled in the art to which the invention relates.

Exemplary embodiments of a system and a method for driving an electrical motor coupled to a load are provided herein. A pump is an exemplary load. Although many of the embodiments described below are described in the context of an electric motor driving a pump, the invention is no so limited and embodiments of the invention may be used to drive any load coupled to a motor driven by a drive unit. Other loads may include traction systems of vehicles, fans, extruders, rollers etc.

Pump systems may be used, among other reasons, to fill tanks, maintain water pressure in a pipe, or pump liquids out of deep wells. Sensors and control switches may be coupled to the PMA to enable the drive unit to control the pumping rate. For example, an on/off switch may be used to turn the drive unit on and off. A level switch may be used to indicate to the drive unit when pumping is necessary to fill a tank and to indicate to the drive unit that the tank is full. A pressure transducer may be used by the drive unit to maintain fluid pressure in a pipe. Different pump types may be coupled to the motor, including centrifugal, positive displacement, reciprocating and any other pump types. PMA's may be purchased as a system or may be assembled by matching the requirements of the motor, the pump and the system application.

PMAs may be configured for different applications. Exemplary applications include water pressure control, water level control, conventional and shale gas, oil, oil-stripper, mine deliquification and deliquification prior to mining, water irrigation systems, waste water and water treatment, chemicals and any other system in which pumps are used to move liquids. Well extraction applications, including coal bed methane and coal seam gas well extraction, may be performed by controlling the water level of the well using level and/or pressure sensors to determine the water level in the well and using the determined water level to control the pumping rate of the PMA. Pressure sensors may also be used to control pressure in a pipe.

Renewable energy sources can be used to power PMAs subject to variations in the availability of said resources. Exemplary renewable energy sources include water, wind and solar. Different control schemes are needed to satisfy demand with renewable energy sources and compensate for or overcome such variations. For example, a control scheme to use solar energy in pumping applications may incorporate a maximum power point control strategy to maximize the amount of energy captured by photovoltaic panels at different insolation levels over time. When the solar energy is insufficient to pump the required amount of water, batteries or a fueled power generator may be connected to the drive unit to satisfy demand, either by supplementing the solar power captured by the photoelectric panels or as an alternate supply source. As used herein, a fueled power generator comprises a machine that converts fuel to electrical energy. Exemplary fuels include natural gas, propane, methane, kerosene, diesel and gasoline.

The drive units may be located on the surface or down-hole in a well. In a water pressure control application, the drive unit may be located in a building to control the water pressure in a water pipe in the building. For example, the drive unit may be located in a basement or a utility room of a home, business or factory. In a well extraction application, the drive unit may be located on the surface near the well head. Alternatively, the drive unit may be submersible and located down-hole, as described with reference to FIG. 2.

As exemplified above, drive units find utility in many applications and can be located in different environments, both indoors and outdoors. One of the challenges in building drive units to satisfy such complex requirements is to provide drive units that are adaptable to changing requirements and technologies. Embodiments of a drive unit including a wireless communication scheme are described below. The wireless communication scheme facilitates communication with the drive unit to enable a user or technician to modify control parameters of the drive unit, update its control logic, and troubleshoot performance. Thus, for example, as new sensors or motors become available, control logic is improved, or the application's requirements change, the drive unit can be updated with a wirelessly communicatively coupled user input device to adapt to these and other changes. The wireless communication scheme has several advantages, including the capability to reduce the cost of the drive unit by excluding from it a complex user input interface, to improve protection of drive components by removing external components that may be susceptible to environmental degradation, and of course, a more flexible way to obtain the updates and bring them to the drive unit or to download from the drive unit performance parameters that can then be analyzed in a comfortable environment rather than at the drive unit's location.

Figure 1:
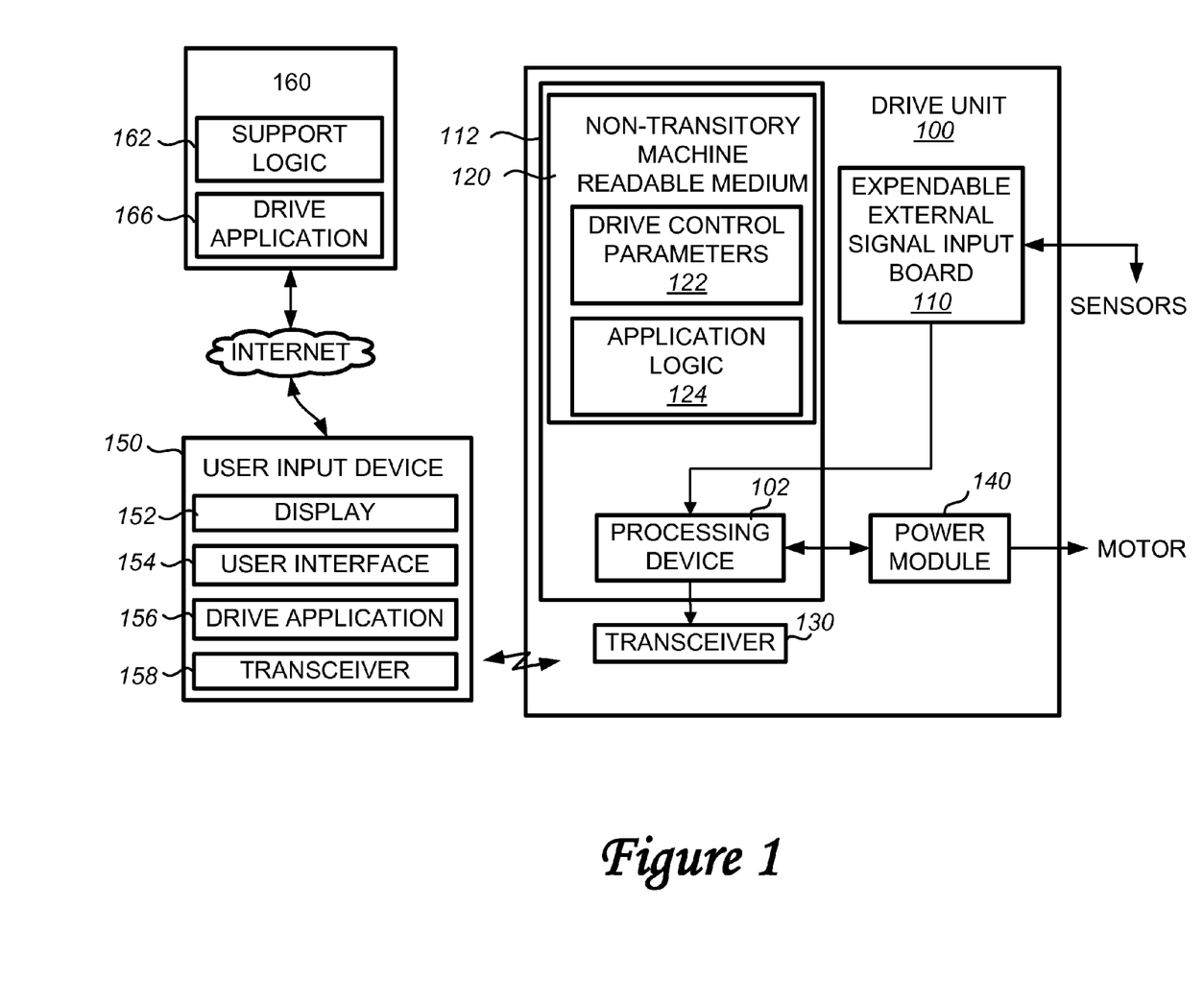
FIG. 1 is a block diagram of an embodiment of a system including a drive unit set forth in the disclosure wirelessly communicatively coupled with a user input interface.

Referring now to FIG. 1, an exemplary embodiment of a drive unit, denoted by numeral 100, comprises a processing device 102, a main board 112 with a non-transitory machine readable medium 120 and a processing device 102, a transceiver 130, and a power module 140 to power a motor (not shown). Power module 140 comprises a plurality of power switches operable to generate a driving voltage for the motor. Also shown in FIG. 1 is a user input device 150 and a web server 160 communicatively coupled to each other and to drive unit 100. Web server 160 may include support logic 162 and a drive application 166. User input device 150 may comprise mobile devices, computers, and dedicated user input devices. Exemplary mobile devices include tablets and smart phones. User input device 150 includes a display 152, a user interface 154, optionally a drive application 156, and a transceiver 158. Exemplary user interfaces include a keyboard, a mouse, a touch screen incorporated with display 152, and any other known user interfaces. Transceiver 158 may comprise more than one protocol for communicating wirelessly with web server 160 and with transceiver 130. As used herein, a transceiver is a device incorporating logic, a transmit portion, and a receive portion, the logic causing transmission and reception of wireless signals respectively by the transmit and the receive portions.

Figure 1A:
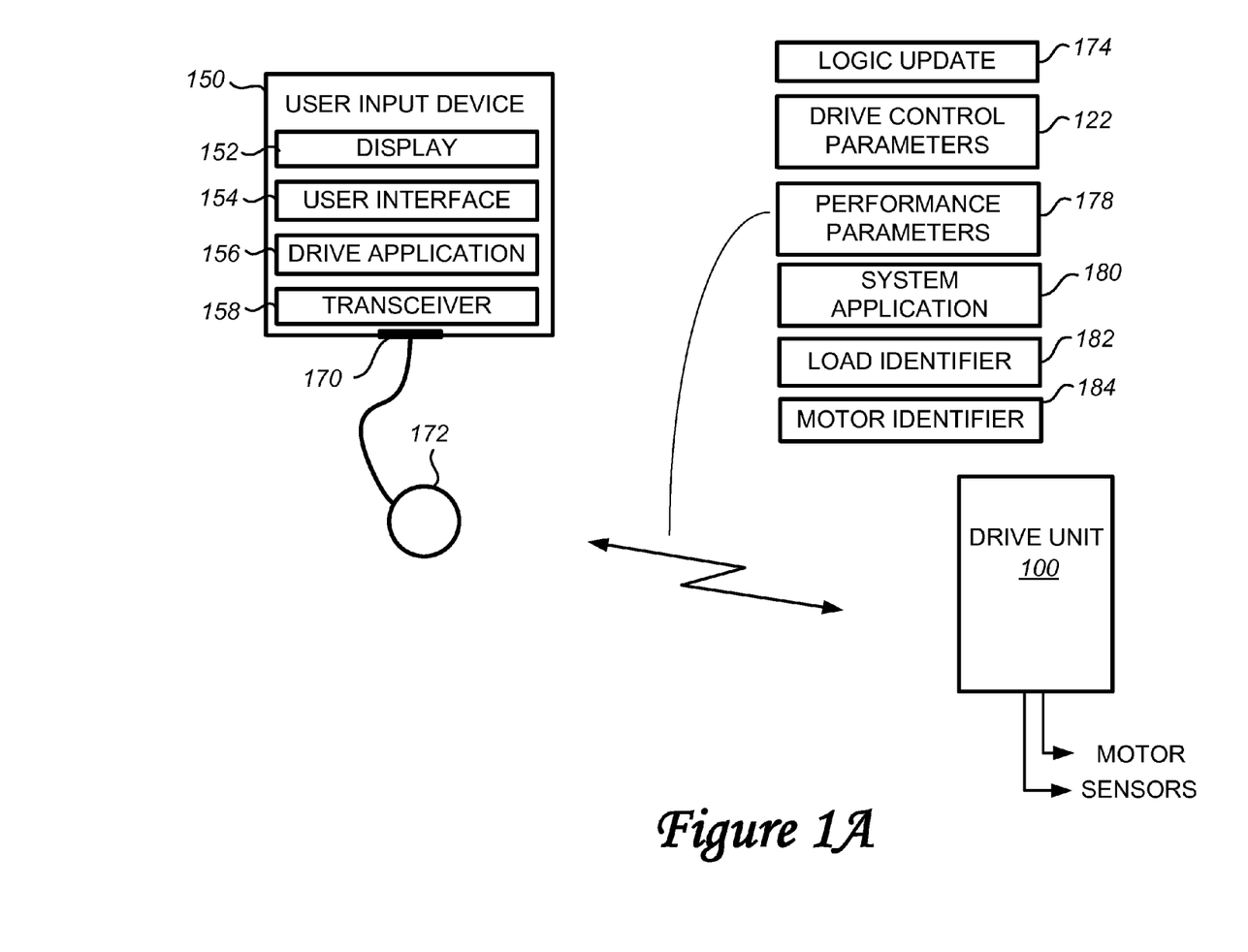
FIG. 1A is a block diagram of another embodiment of a system including a drive unit set forth in the disclosure wirelessly communicatively coupled with the user input interface.

In one example, user input device 150 may also comprise a communications protocol and a hardware port to communicate with drive unit 100 via a cable connection. In another example of the foregoing variation, illustrated in FIG. 1A in block diagram form, user input device 150 comprises a communication protocol and hardware port 170 to communicate with a dongle 172 coupled to hardware port 170. Dongle 172 includes a transceiver to communicate with drive unit 100. Advantageously, dongle 172 may comprise a communications protocol unavailable in standard user input devices. Dongle 172 may be customized to provide additional flexibility and security.

In one variation of the present embodiment, a user accesses support logic 162 to download drive application 156 into user input device 150. Support logic 162 may comprise HTML code well known in the art for enabling users to select features, download applications and perform typical functions performed by websites. After downloading, the user accesses drive application 156 in user input device 150 to communicate with drive unit 100. Drive application 156 may enable the user to change drive control parameters 122, download a logic update 174 to update application logic 124, and/or retrieve performance parameters 178. Exemplary performance parameters include operating history of drive variables such as voltage, current, torque, speed, faults and other variables indicative of the performance of drive unit 100. Drive application 156 may also enable the user to select configuration information including a system application 180, a load identifier 182 and a motor identifier 184. An exemplary load identifier is a pump model.

In an embodiment of a method executed with embodiments of the system described above, after downloading, a user accesses drive application 156 to communicate with support logic 162 and downloads a logic update 174 (to update application logic 124) into user input device 150. User input device 150 then establishes communications with drive unit 100 and downloads logic update 174 to drive unit 100. The present variation is well suited for applications in which drive unit 100 does not have Internet access. The user can download the update to user input device 150 by accessing the Internet and then, perhaps at a different location, establishing communications with drive unit 100. Drive application 156 may provide options to the user to authorize downloading of logic update 174 or to initiate communication with drive unit 100.

In a variation of the present embodiment, a user accesses drive application 166 with user input device 150 to communicate with drive unit 100. Drive application 166 includes the functionality of drive application 156 described above. The user may then change drive control parameters 122, download logic updates 174 to drive unit 100, and retrieve performance parameters 178 from drive unit 100, without downloading drive application 156. In one example, the user can perform the foregoing functions remotely if drive unit 100 has Internet access.

The user may select an update with support logic 162, which may list different logic updates. The logic updates may comprise new and old versions of portions of application logic 124 corresponding to different functionalities of drive unit 100. Thus, the user may customize drive unit 100 by selecting new and old portions of different functionalities of application logic 124.

In one embodiment, the logic update may be downloaded to flash memory of drive unit 100 (not shown). Before drive unit 100 restarts, application logic 124 checks the flash memory and, upon determining based on the check that a logic update has been downloaded, installs the logic update.

Transceiver 130 is configured to communicate with transceiver 158. Wireless communications include any known or future developed communication technique or protocol, including Wi-Fi, ZigBee and Bluetooth protocols. The Wi-Fi protocol is a wireless local area network protocol based on the IEEE 802.11 standard. Devices using Wi-Fi can connect to the Internet. ZigBee is based on the IEEE 802.15 standard, a protocol to create personal area networks. Bluetooth is another personal area network protocol, and is based on the IEEE 802.15.1 standard. The aforementioned wireless protocols may be used by drive unit 100 and user input device 150 to communicate with each other, with or without a dongle. User input device 150 may also have a Wi-Fi or a cellular communications interface to connect to the Internet. Drive unit 100 may also have a Wi-Fi or a cellular communications interface to connect to the Internet, which would enable a user to communicate remotely with drive unit 100. As used herein, remotely means outside the range of direct wireless communications between two devices. Thus, for example, user input device 150 may communicate with drive unit 100 using the Bluetooth protocol if user input device 150 is not remotely located but not if it is remotely located. By contrast, user input device 150 may only remotely wirelessly communicate with drive unit 100 if both devices are communicatively coupled to the Internet. Of course, drive unit 100 and user input device 150 may include connectors to establish a wired connection.

In another embodiment, application logic 124 and drive application 156, 166 may be configured to enable the user to configure drive unit 100 for different applications and operating modes. The user may input, when prompted by drive application 156, 166, pumping application, PMA, components, mode parameters and/or other installation information to configure drive unit 100 with the aid of installation logic, which may be comprised in application logic 124.

Non-transitory machine readable medium 120 includes drive control parameters 122, and application logic 124. Application logic 124 may include control logic and installation logic. Power module 140 receives control signals from processing device 102 as instructed by application logic 124 to provide a suitable power signal to the motor. Power modules comprise power switches which are switched by motor control logic to generate appropriate power waveforms. Operation of power modules is well known in the art. Additional control techniques are described below with reference to FIG. 6.

In embodiments of drive unit 100, drive unit 100 includes an input signal interface, illustratively an expendable external signal input board 110, which receives signals from surge input devices such as signal transduces. The operation and function of expendable external signal input board 110 is described below with reference to FIGS. 3 and 4. Expendable external signal input board 110 is configured to be easily replaceable in case it becomes damaged, and it is configured to become damaged before the cause of the damage also damages a main board of drive unit 100. Thus, for the fraction of the drive unit's cost corresponding to the expendable board, a user can restore the functionality of the drive unit, thus avoiding the high replacement cost of a damaged drive unit.

Figure 2:
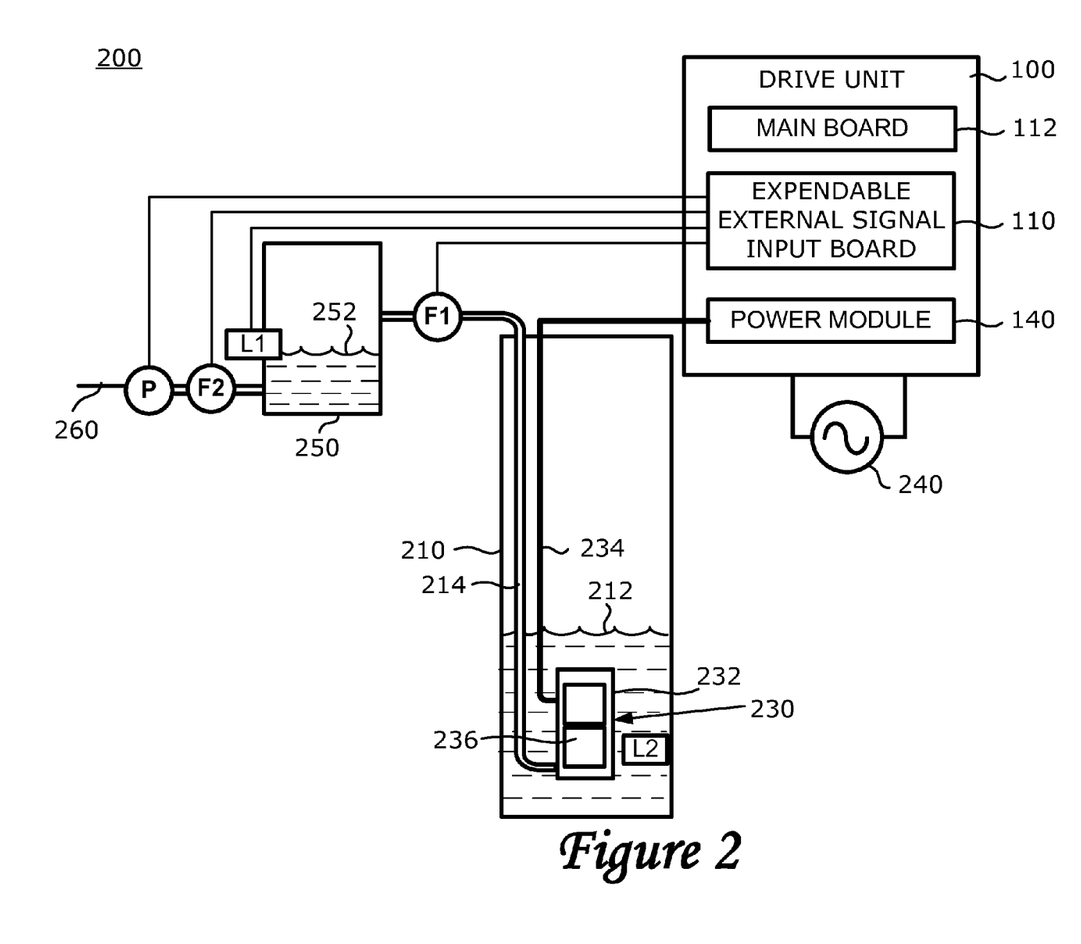
FIG. 2 is a diagrammatic representation of an embodiment of a liquid supply system set forth in the disclosure.

Referring to FIG. 2, a diagrammatic representation of an embodiment of a liquid supply system 200 is disclosed.

Liquid supply system 200 comprises a reservoir 210 containing a liquid 212 which is pumped by a PMA 230 through a conduit 214 into a reservoir 250 holding liquid 252. Pump unit 230 includes a pump 236 driven by a motor 232 which is powered by drive unit 100 via electrical conductors 234. Drive unit 100 is supplied electrical power from a power source. An exemplary alternating current (AC) power source 240 is shown. Other power sources include renewable energy sources such as solar panels, fuel cells and wind generators, and energy storage devices such as batteries and storage capacitors. In one example, drive unit 100 is a variable frequency drive (VFD) and pump 236 is a conventional centrifugal pump. Motor 232 may comprise single and multi-phase induction motors. During operation of the system, liquid 212 flows through conduit 214 to reservoir 250 and out though conduit 260 for use in the fluid application. Fluid characteristics including liquid level, flow rate differential, and pressure, may be monitored with a level sensors L1 and/or L2, flow sensors F1 and F2 and a pressure sensor P to generate a demand signal representative of flow required to satisfy setpoint conditions. Exemplary setpoint conditions include fluid level, pressure and inflow/outflow rate differential. Sensor L2 may be monitored to detect potential dry run conditions and shut the drive down to prevent damage. Reservoir 210 may be an aboveground or underground tank, a well casing, or any other reservoir containing liquid 212. Reservoir 250 may be an underground, aboveground tank, a pressure tank, or any other liquid containment device.

Supply system 200 may be exposed to lightning strikes which could damage drive unit 100. In some embodiments, a drive unit includes an expendable external signal input board. The term "expendable" as used herein denotes an input board with protection features configured to protect the circuit connected to the expendable external signal input board from signal spikes. An exemplary expendable external signal input board receives external signals from transducers, such as pressure, level or flow transducers. Exemplary protection features include protective signal traces. In one example, the expendable external signal input board comprises quick-disconnect connectors configured to quickly attach and detach the expendable external signal input board from a main board. The expendable external signal input board may intercept damaging lightning voltage spikes which may travel from the transducer signals. If the board is damaged, it can be easily and quickly replaced.

Set forth below are embodiments of a drive unit and methods of operating the drive unit to improve its utilization. In some embodiments, the drive unit comprises: a main board including a protected ground trace having a current capacity; and an expendable external signal input board adapted to receive input signals from an external device through signal conductors, the expendable external signal input board including a primary surge protection device electrically coupled to the signal conductors and an expendable ground trace having an expendable ground trace current capacity which is less than the current capacity of the protected ground trace, the primary surge protection device configured to ground the signal conductors, upon detection of a voltage exceeding a predetermined voltage, through a path to ground including the expendable ground trace and the protected ground trace, the expendable ground trace configured to break the path and protect the protected ground trace.

In some embodiments, the primary surge protection device comprises a gas discharge tube. In some embodiments, a method of extending utilization of a drive unit comprises: operating a drive unit comprising a main board and an expendable external signal input board, the main board including a protected ground trace having a current capacity, the expendable external signal input board adapted to receive input signals from an external device through signal conductors, the expendable external signal input board including a primary surge protection device electrically coupled to the signal conductors and an expendable ground trace having an expendable ground trace current capacity which is less than the current capacity of the protected ground trace, and the primary surge protection device configured to ground the signal conductors, upon detection of a voltage exceeding a predetermined voltage, through a path to ground including the expendable ground trace and the protected ground trace, the expendable ground trace configured to break the path and protect the protected ground trace; determining that the drive unit ceased operating; replacing the expendable external signal input board; and continuing operating the drive unit. In one example, the method further comprises, upon determining that the drive unit ceased operating, determining that the expendable ground trace is damaged.

Figure 3:
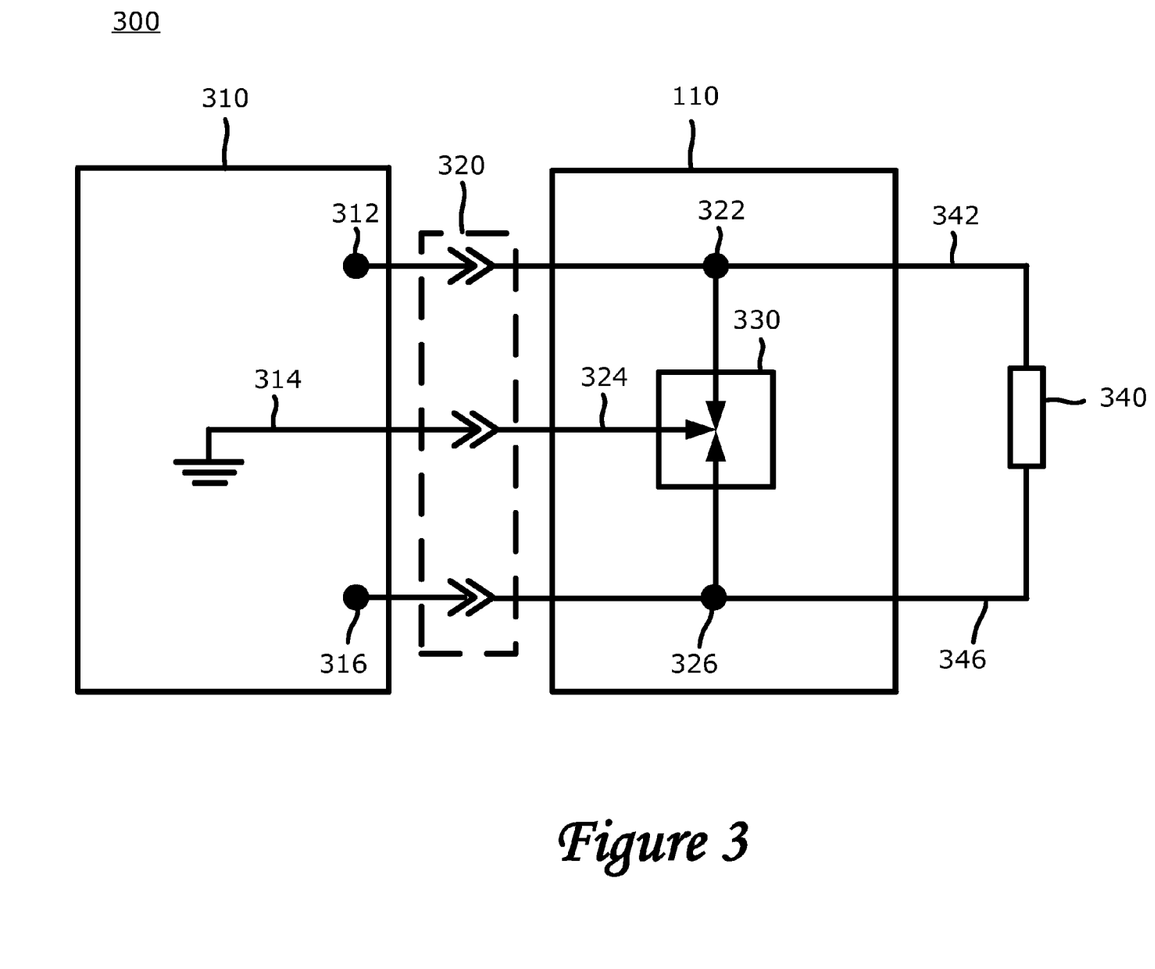
FIG. 3 is a diagrammatic representation of an embodiment of an expendable external signal input board set forth in the disclosure.

FIG. 3 is a diagrammatic representation of an embodiment 300 of an expendable external signal input board 110 electrically coupled to a main board 310 at nodes 312, 314 and 316. In one example, a quick-disconnect device is used to connect nodes 312, 314 and 316 to nodes 322, 324 and 326 of expendable external signal input board 110. A quick-disconnect connector 320 is shown. Additional quick-disconnect devices include individual quick-disconnect connectors, screws and nuts, and any other known connection device that permits removal of expendable external signal input board 110 quickly and easily. Expendable external signal input board 110 includes a primary surge protection device 330 electrically coupled to nodes 322, 324 and 326. Exemplary primary surge protection devices include gas discharge tubes, metal oxide varistors, thyristor surge protection devices such as Trisils and SIDACTors, and any other protection circuit configured to suppress high voltages surges. A surge input device 340 is electrically coupled to nodes 322 and 326 by conductors 342 and 346, and therethrough to nodes 312 and 316 of main board 310. Exemplary surge input devices include sensors, such as level and pressure sensors, switches, and any other electrical devices which in use are located outside drive unit 100 and exposed to power surges from the environment, such as lightning, or via induction, such as from other electrical machines and switchgear. Nodes 312 and 316 couple surge input device 340 to control logic (not shown) on main board 310. Control logic receives signals from surge input device 340 and uses the signals to control operation of PMA 230. Conductors 342 and 346 may induce electrical surges due to exposure to external conditions such as lightning, and may be referred to as surge input devices. Primary surge protection device 330 protects main board 310 and, if it becomes damaged, can be easily replaced by replacing expendable external signal input board 110.

Figure 4:
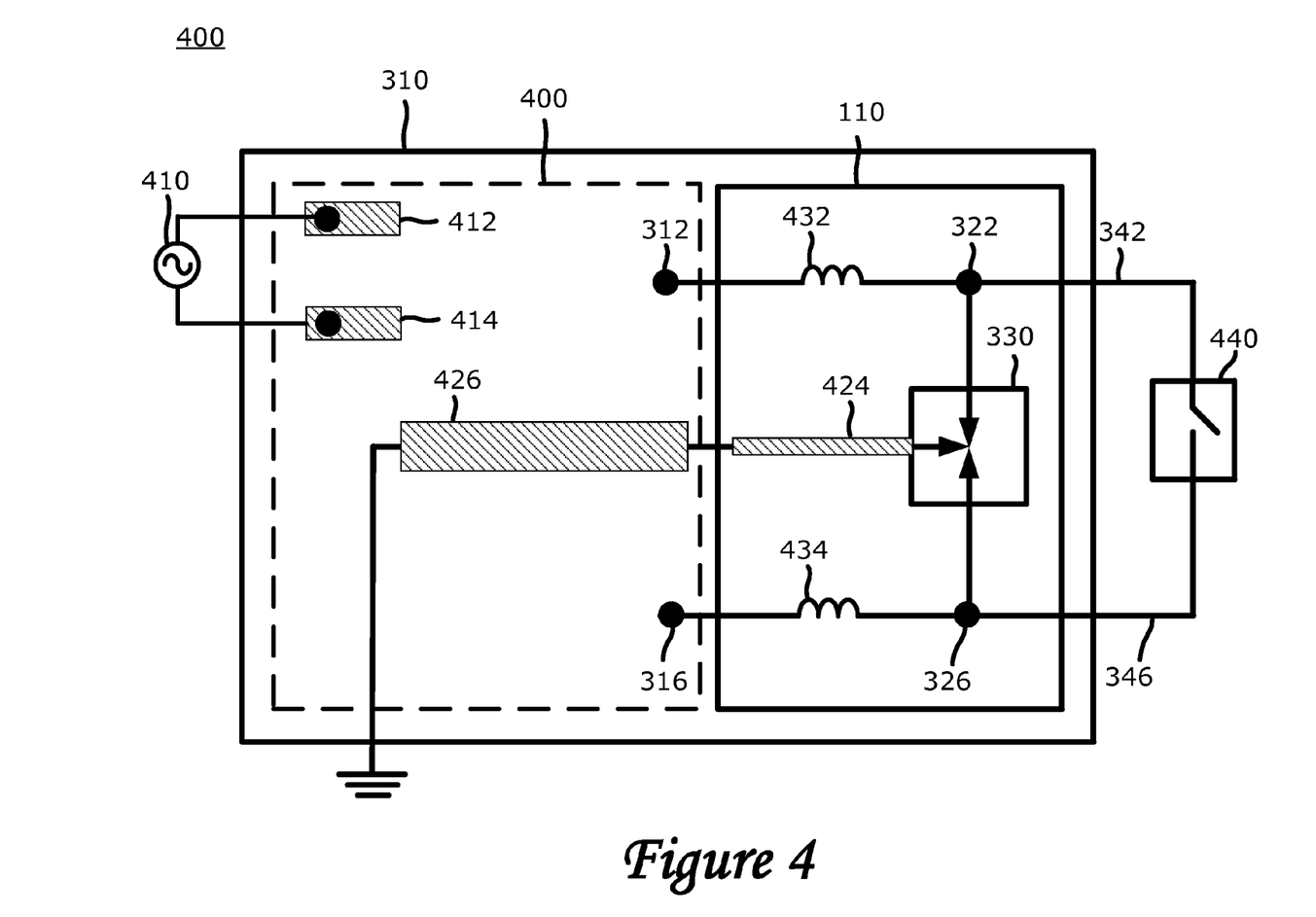
FIG. 4 is a diagrammatic representation of an embodiment of an expendable external signal input board coupled to a main board in a manner set forth in the disclosure.

FIG. 4 is a diagrammatic representation of an embodiment 400 of an expendable external signal input board 110 electrically coupled to a main board 310. In the present embodiment, surge input device 340 comprises a level switch 440. In some embodiments, drive unit 100 further comprises a secondary surge protection device consisting of differential-capacity current traces. In one example, the differential-capacity current traces include an expendable trace, illustratively expendable external signal input board ground trace 424, and a protected trace, illustratively main board ground trace 426. The protected trace has a current capacity greater than the current capacity of the expendable trace. When primary surge protection device 330 is activated by a voltage surge, it shorts nodes 322 and 326 to ground through expendable external signal input board ground trace 424 and main board ground trace 426. If the current flowing to ground is excessive, expendable external signal input board ground trace 424 will become damaged and stop conducting due to its lower current capacity, protecting main board ground trace 426 and main board 310. Current capacity may be determined by the cross-sectional area of the traces. In one example, differential-capacity current traces are configured such that the expendable trace has a smaller cross-sectional area than the protected trace.

Traces 424 and 426 are shown as rectangles having different widths corresponding to their differential current capacities. Inductors 432 and 434 are provided between nodes 312 and 322 and between nodes 316 and 326. The inductors oppose surge currents that may transit past nodes 322 and 326. A control logic area 400 of main board 310 is shown to illustrate a location on main board 310 where control logic may be located. Expendable external signal input board 110 may be placed over main board 310 with stand-offs or may be placed such that it does not overlap main board 310. Also shown are power traces 412 and 414 coupled to power source 240. Power traces 412 and 414 distribute power to main board 110. Traces 412 and 414 are shown as rectangles having widths corresponding to their current capacities. The current capacities of the power traces are greater than the current capacity of the expendable trace, e.g. trace 424, but less than the current capacity of protected trace, e.g. trace 426.

It may be desirable to constrain the size of drive unit 100. Size constraints bring components closer together increasing the possibility of electromagnetic interference ("EMI"). In some embodiments, a drive unit comprises: a main board including control logic, and a flux fringing filter adjacent the control logic, the flux fringing filter comprising three open-core inductors arranged in a triangular topology with the cores of the open-core inductors extending substantially perpendicularly from the main board, the flux fringing filter configured to cancel stray flux.

Figure 5:
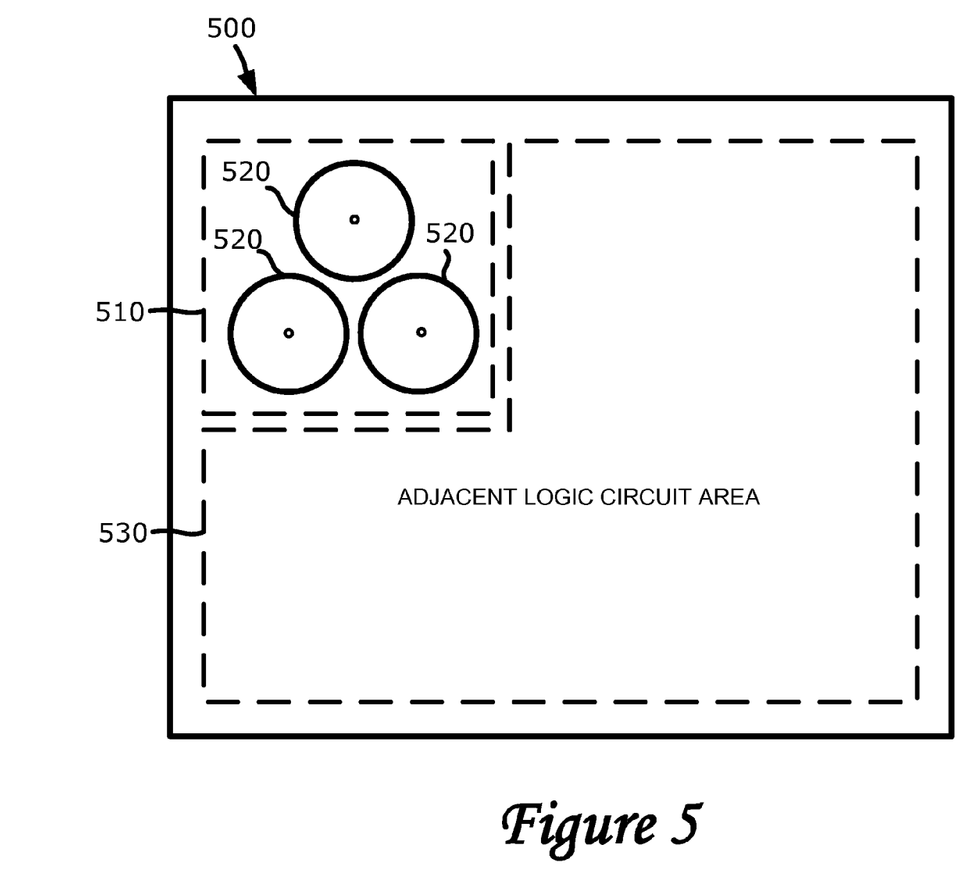
FIG. 5 is a diagrammatic representation of a main board including an embodiment of a flux fringing filter set forth in the disclosure.

FIG. 5 is a diagrammatic representation of an embodiment of main board 500 including a flux fringing filter, denoted by numeral 510. The flux fringing filter comprises three open-core output inductors 520 arranged in a triangular topology, each coupled to a power line. The inductors function as differential high frequency filters to reduce electromagnetic interference (noise) on the power lines. The open-core inductors generate stray flux that is cancelled by the triangular topology such that it does not interfere with circuits in the adjacent In some embodiments, drive unit 100 further comprises a secondary surge protection device consisting of differential-capacity current traces.

Returning now to wireless communication schemes, in one embodiment, the drive unit includes installation logic configured to cause the processing device to receive information including a system application, a pump identifier and a motor identifier. With this information, the installation logic, which may be included in the drive control logic, sets-up the drive control parameters and drive configuration based on the application, pump and motor indicated b the information. The term "logic" as used in this patent application includes software and/or firmware executing on one or more programmable processing devices, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. Exemplary logic includes application, communications, and installation logic.

Set forth below are embodiments of a system comprising: a drive unit configured to drive a motor coupled to a pump, the drive unit including a processing device and a non-transitory machine readable medium having embedded therein processing instructions configured to perform a method when executed by the processing device, the method including: the processing device receiving configuration information from a user with a wireless user interface, the configuration information including a system application and a motor identifier; the processing device configuring the drive unit based on the configuration information.

In one example, the system includes the motor and the pump. In one example, the configuration information includes a pump identifier. In one example, a user provides installation information with the user input device to the installation logic, such as a motor model, a pump type and model, a system application and an operating mode. Based on the installation information, the installation logic configures the drive control parameters, including system application and operating mode. The PMA can communicate performance parameters to the user input device to be viewed or analyzed by the user. The user may also retrieve fault history, service information, real time running data and operation life data.

In one implementation, mobile server logic resides in the drive unit, and the drive unit communicates wirelessly with the user input device without requiring access to the Internet. This implementation is suitable for installations where Internet access is not readily available. Installation logic may include pump profiles, pumping models, and other selectable information, and updated application logic.

In one variation of the present embodiment, the installation logic automatically verifies that system components selected with a user input device match installed components by comparing installed component characteristics stored in component profiles to measurements performed after installation of the components. Exemplary measurements include the direction of rotation of a motor and actual drive unit performance for a given fluid parameter. Based on the entered information the installation logic may test the PMA to verify compliance with predetermined performance profiles or may compare the motor's resistance with specified values to verify the motor matches the given motor model. The installation logic may operate the PMA to verify that the motor rotates in the proper direction. The installation logic may also determine the head level of the pumping system and verify that the PMA's operation matches a predetermined pump curve. Exemplary pump curves are described with reference to FIG. 6.

In a further embodiment, the PMA includes multiple pump profiles corresponding to multiple pump types. Based upon the installation information, the installation logic automatically selects a control profile based on the type of pump connected to the motor.

In another variation of the present embodiment, the installation logic facilitates selection of a system application. The system application may be selected to maintain fluid pressure, flow rate, or fluid level, for example, with a selected pump-motor assembly (PMA) or selected pump type. Different pump types have different performance characteristics. In one example, the installation logic presents a graphical user interface with which a user can choose a system application, and the installation logic also facilitates tailoring of a pump profile based on the selected system application. In another example, the installation logic presents a graphical user interface with which a user can choose a PMA, and the installation logic then chooses a pump profile. In a variation of the present embodiment, the installation logic selects a system application or a pump profile based on the selection of the pump type.

In another embodiment, the PMA comprises selectable operating modes suitable in system applications. A user may select from a number of operating modes, using the installation logic, to optimize the operation to, for example, increase reliability by extending the life of the PMA, or to increase efficiency.

In some embodiments, the operating mode is a life extension mode in which a relatively constant power module temperature is maintained. Maintaining the temperature constant, or at least preventing sudden and frequent temperature swings, will reduce fatigue and extend the life of the power module and, consequently, improve the reliability of the drive unit.

In one variation, the speed of the motor is folded back to prevent increasing temperature. A temperature control algorithm folds-back the speed of the motor based on the power module's temperature. If the temperature T of the power module reaches a first limit, Ta, the drive unit will not increase the speed of the motor. If the temperature increases until it reaches a second limit, Tb, the drive unit will decrease the speed of the motor in steps, over time. If the temperature increases until it reaches a third limit, Tc, the drive unit will decrease the speed of the motor in steps over time, but at a faster rate. If the drive unit reaches a minimum speed, it will shut itself off.

In another variation of the life extension mode, the drive unit comprises a power module configured to provide power to the motor, and a fan or fans configured to circulate air in the drive unit to cool the power module. Exemplary fans include constant speed fans and variable speed fans. The power may be coupled to a heat sink and the fans may be connected to circulate air through the heat sink. The amount of air circulating through the heat sink is controlled by control logic of the drive unit to increase air circulation, and cooling, as the power module temperature increases. For example, circulation/cooling may be increased as the temperature difference between the actual power module temperature and a predetermined safe temperature increases. In one example, circulation is increased by increasing the speed of a variable speed fan. In another example, multiple constant speed fans are provided and selectively engaged to increase air circulation.

In a further variation, life extension comprises controlling both the drive unit's power output and air circulation to maintain a relatively constant power module temperature.

In some embodiments, the operating mode is an efficiency mode in which the fluid parameter is controlled within a wider than typical control band to reduce the number of control adjustments.

Generally, a system for operating a pump includes a pump and a motor coupled to a drive unit, e.g. a variable speed drive, to drive the pump. Exemplary variable speed drives include variable frequency drives. The variable speed drive provides operating parameters of the system, including voltage and current. If the variable speed drive is a variable frequency drive, the frequency relates to the speed of the pump. In other drives, the motor's voltage may be indicative of speed. Therefore, the speed of the pump and the motor's current, as well as the motor torque, are derivable from the drive's operating parameters. In disclosed embodiments of the invention, the operating parameters and transducer signals are characterized during normal operation of the pumping system. Parameters are then predicted, and the predictions are compared to actual values to determine whether the transducer has become damaged, to control the speed of the pump, and to determine dry-run or pump-off conditions, for example.

In a motor driven by a variable frequency drive, torque may be calculated as follows:

$$T = \frac{\sqrt{3} \times V \times I \times PF}{\omega}$$

T—Torque
V—Voltage
I—Current
PF—Power Factor
ω—rotational speed

The torque also has a proportional relationship to the motor's current and is influenced by the actual operating point as well. As an illustration, the current is also influenced by the speed or rather total load on the shaft. Additionally, the load and magnetization component of the current are to be separated so that the load component can be used to establish the correlation. Thus, current can be used to predict water level under unchanging system conditions. Furthermore, water level may be predicted by refining the correlation with additional information.

Figure 6:
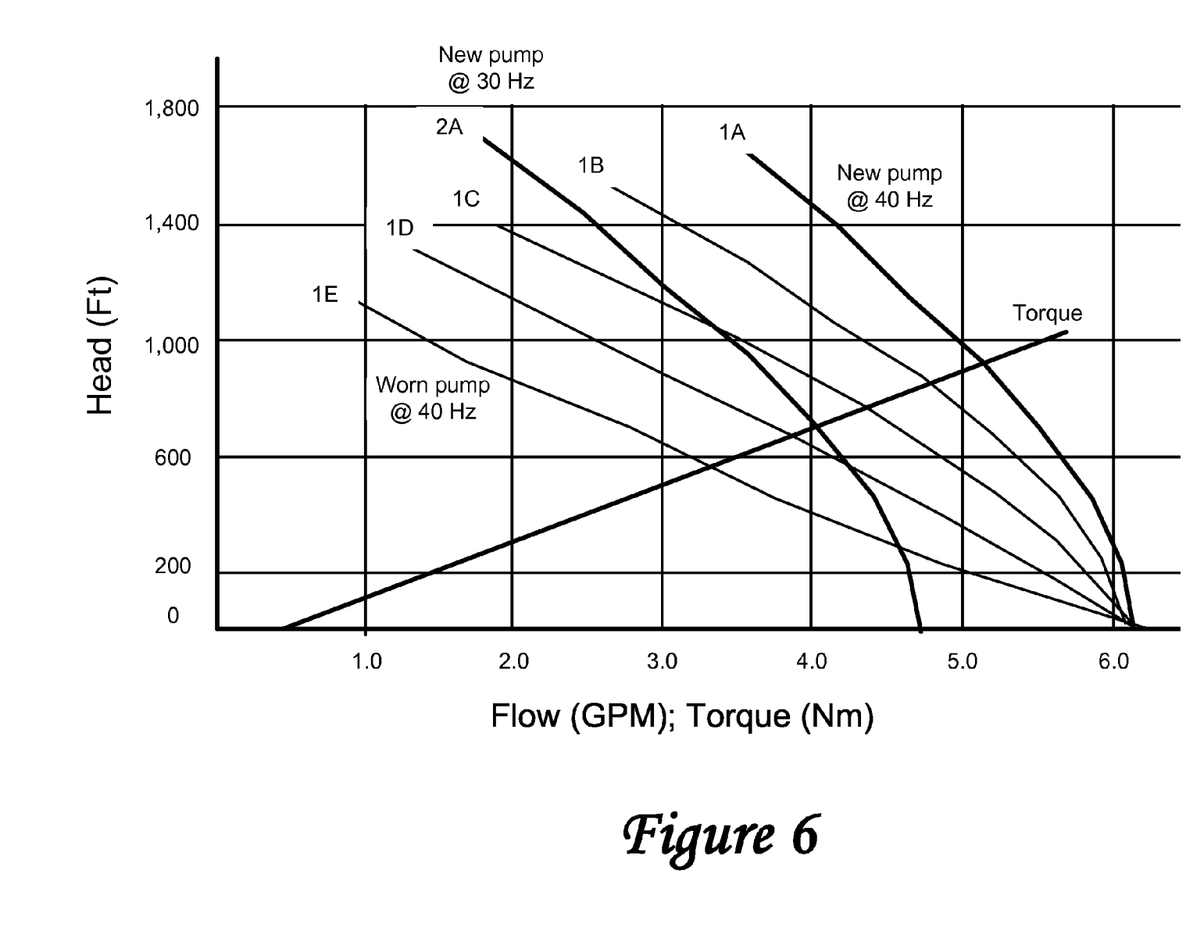
FIG. 6 is an exemplary pump model set forth in the disclosure.

As the water level in a well measured from the surface decreases (presenting the pump with an increasing head/pressure to pump against), the torque presented to the motor increases. FIG. 6 is a graph illustrating an exemplary relationship between torque, flow and pressure, or head. Torque is represented by a straight line crossing the horizontal axis at a torque of about 0.5 Nm. Torque increases proportionally with head irrespective of wear. At a head of about 1,000 feet, torque equals about 5.5 Nm. The graph also shows multiple flow curves, labeled 1A-1E, corresponding to a frequency, of a variable frequency drive, equal to 40 Hz. At a head of 0 ft., there is no flow. As head increases, flow also increases. However, as can be seen at a head of 600 feet, for example, more flow is generated under curve 1A (~5.6 gpm) corresponding to a new pump, than under curve 1E (~3.2 gpm) corresponding to a worn pump. Curve 2A corresponds to a new pump operating at a slower speed, 30 Hz. As expected, a slower speed generates less flow. Noticeably, the graph illustrates that when head, or water level, is known, torque can be predicted, and speed can be adjusted to produce a desired, and predictable, flow. Conversely, if torque is known, head can be predicted for a given flow and pump wear.

In one embodiment, drive unit 100 controls a pump to produce a desired flow based on a pump model that includes the curve described with reference to FIG. 6. In one example, the variable frequency drive selects a speed based on torque to achieve a desired flow. The torque value corresponding to the flow is selected based on a curve representing the wear level of the pump, which can be determined empirically, can be based on a standard model and can be based on a calibrated model, based on initial measurements. Initial measurements may be determined upon installation by installation logic. The initial measurements, or some of them, may be corroborated by the user during installation. In other embodiments, a DC variable speed drive or other drive units may be used to model the torque/head relationship. The models can be stored as pump or application profiles, selectable and configurable by application logic 124.

As used herein, processing instructions include a single application, a plurality of applications, one or more programs or subroutines, software, firmware, and any variations thereof suitable to execute instruction sequences with a processing device.

As used herein, a processing or computing system or device, may be a specifically constructed apparatus or may comprise general purpose computers selectively activated or reconfigured by software programs stored therein. The computing device, whether specifically constructed or general purpose, has at least one processing device, or processing device, for executing processing instructions and computer readable storage media, or memory, for storing instructions and other information. Many combinations of processing circuitry and information storing equipment are known by those of ordinary skill in these arts. A processing device may be a microprocessor, a digital signal processor (DSP), a central processing unit (CPU), or other circuit or equivalent capable of interpreting instructions or performing logical actions on information. A processing device may encompass multiple processors integrated in a motherboard and may also include one or more graphics processors and embedded memory. Exemplary processing systems include workstations, personal computers, portable computers, portable wireless devices, mobile processing devices, and any device including a processor, memory and software. Processing systems also encompass one or more computing devices and include computer networks and distributed computing devices.

As used herein, a non-transitory machine readable storage medium comprises any medium configured to store data, such as volatile and non-volatile memory, temporary and cache memory and optical or magnetic disk storage. Exemplary storage media include electronic, magnetic, optical, printed, or media, in any format, used to store information. Computer readable storage medium also comprises a plurality thereof.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component. Therefore, the term "memory device" includes any variation of electronic circuits in which processing instructions executable by a processing device may be embedded unless otherwise expressly stated in connection with the specific use of the term. For example, a memory device includes read only memory, random access memory, a field programmable gate array, a hard-drive, a disk, flash memory, and any combinations thereof, whether physically or electronically coupled. Similarly, a processing device includes, for example, a central processing unit, a math processing unit, a plurality of processors on a common integrated circuit, and a plurality of processors operating in concert, whether physically or electronically coupled. Furthermore and in a similar manner, the term "application," in the context of an algorithm or software, includes a single application, a plurality of applications, one or more programs or subroutines, software, firmware, and any variations thereof suitable to execute instruction sequences with a processing device.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A system comprising:
a drive unit adapted to drive a motor coupled to a load, the drive unit including a processing device, a wireless transceiver, and a non-transitory machine readable medium having embedded therein processing instructions configured to perform a method when executed by the processing device, the drive unit further comprising a main board and an expendable external signal input board removably connected to the main board, the expendable external signal input board including a signal conductor and a primary surge protection device configured to ground the signal conductor upon detection of a voltage of the signal conductor exceeding a predetermined voltage to protect the main board, the method including:
receiving a selection, with a drive application installed in a portable user device, of a configuration information including a motor identifier and a system application;
wirelessly receiving, by the wireless transceiver, the configuration information; and
configuring, by the processing device, the drive unit based on the configuration information.

2. A system as in claim 1, the method further comprising operating the motor, determining performance parameters, comparing the performance parameters to control parameters associated with the system application and the motor identifier, and verifying a correct configuration of the drive unit based on the comparing.

3. A system comprising:
a drive unit adapted to drive a motor coupled to a load, the drive unit including:
a main board; and
an expendable external signal input board removably connected to the main board, the expendable external signal input board including a signal conductor and a primary surge protection device configured to ground the signal conductor upon detection of a voltage of the signal conductor exceeding a predetermined voltage to protect the main board.

4. A system as in claim 3, the main board including a protected ground trace, the expendable external signal input board including an expendable ground trace removably connected to the protected ground trace and configured to cease conducting current flowing from the grounded signal conductor before the current damages the protected ground trace.

5. A system as in claim 4, the protected ground trace having a current capacity that exceeds a current capacity of the expendable ground trace.

6. A system as in claim 3, the primary surge protection device comprising a gas discharge tube.

7. A system as in claim 3, the main board further comprising application logic and a flux fringing filter adjacent the application logic, the flux fringing filter comprising three open-core inductors arranged in a triangular topology to cancel stray flux, with the cores of the open-core inductors extending substantially perpendicularly from the main board.

8. A system as in claim 1, wherein the drive unit includes life extension logic configured to control at least one of a cooling apparatus and a power consumption of the drive unit to maintain a temperature of the drive unit within a preselected temperature range.

9. A system as in claim 8, wherein the life extension logic includes a fold-back algorithm configured to cause the processing device to fold-back a speed of the motor to reduce power consumption.

10. A system as in claim 1, wherein the drive unit is configurable in two or more operating modes including one of a life extension mode and an efficiency mode, wherein the configuration information includes an operating mode selection to configure the drive unit in one of the operating modes.

11. A method for controlling a motor coupled to a load for use in an application, the method comprising:
   driving the motor with a drive unit including a wireless transceiver and a processing device;
   receiving a selection, with a drive application installed in a portable user device, of a configuration information including a motor identifier and a system application;
   by the wireless transceiver, wirelessly receiving the selection of the configuration information including the system application and the motor identifier, wherein the system application includes predetermined procedures to drive the motor according to the application; and
   by the processing device, configuring the drive unit based on the configuration information.

12. A method as in claim 11, further comprising:
   downloading a logic update into a user input device;
   downloading the logic update from the user input device to the drive unit; and
   updating an application logic of the drive unit with the logic update.

13. A method as in claim 11, the configuration information including drive control parameters, further comprising updating application logic of the drive unit with the drive control parameters.

14. A method as in claim 11, further comprising: operating the motor, determining performance parameters, comparing the performance parameters to control parameters associated with the system application and the motor identifier, and verifying a correct configuration of the drive unit based on the comparing.

15. A method as in claim 11, further comprising controlling at least one of a cooling apparatus and a power consumption to maintain a temperature of the drive unit within a preselected temperature range.

16. A method as in claim 15, wherein controlling power consumption comprises, by the processing device, folding-back a speed of the motor to reduce power consumption if the temperature exceeds the preselected temperature range.

17. A method comprising:
   driving a motor coupled to a load with a drive unit including a wireless transceiver and a processing device;
   receiving a selection, with a drive application installed in a portable user device, of a configuration information including a motor identifier and a system application;
   by the wireless transceiver, wirelessly receiving the configuration information; and
   by the processing device, configuring the drive unit based on the configuration information, wherein the drive unit comprises a main board and an expendable external signal input board including a primary surge protection device, the method further comprising:
   upon sensing a voltage of an input signal greater than a predetermined voltage, the primary surge protection device grounding the input signal;
   determining that the expendable ground trace is damaged; and
   replacing the expendable external signal input board without replacing the main board.

18. A method as in claim 17, wherein the main board has a protected ground trace having a current capacity and the expendable external signal input board includes an expendable ground trace having a current capacity which is less than the current capacity of the protected ground trace.

19. A system configurable for use in an application of a motor coupled to a load, the system comprising:
   a drive unit adapted to drive the motor, the drive unit including a processing device, a wireless transceiver, and a non-transitory machine readable medium having embedded therein processing instructions configured to perform a method when executed by the processing device, the method including:
   receiving a selection, with a drive application installed in a portable user device, of a configuration information including a motor identifier and a system application;
   by the wireless transceiver, wirelessly receiving the configuration information, wherein the system application includes predetermined procedures to drive the motor according to the system application; and
   by the processing device, configuring the drive unit based on the system application and the motor identifier.

20. The system of claim 19, the method further comprising operating the motor, determining performance parameters, comparing the performance parameters to control parameters associated with the system application and the motor identifier, and verifying a correct configuration of the drive unit based on the comparing.

21. The system of claim 19, wherein the application is selected from a water pressure control application, a water level control application, a deliquification application, a water irrigation application, a waste water treatment application, a well extraction application, a coal bed methane extraction application, or a coal seam gas well extraction application.

22. The method of claim 11, wherein the application is selected from a water pressure control application, a water level control application, a deliquification application, a water irrigation application, a waste water treatment application, a well extraction application, a coal bed methane extraction application, or a coal seam gas well extraction application.

* * * * *